US009491959B2

(12) United States Patent
Monsoor et al.

(10) Patent No.: US 9,491,959 B2
(45) Date of Patent: Nov. 15, 2016

(54) NUTRITIONAL PRODUCTS HAVING A MODULATED OFF-TASTE INTENSITY AND METHODS FOR MAKING AND USING SAME

(71) Applicant: NESTEC S.A., Vevey (CH)

(72) Inventors: Mamum Al Monsoor, Maple Grove, MN (US); Abby Mary Bauer, Minneapolis, MN (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 14/381,838

(22) PCT Filed: Mar. 1, 2013

(86) PCT No.: PCT/EP2013/054220
§ 371 (c)(1),
(2) Date: Aug. 28, 2014

(87) PCT Pub. No.: WO2013/128024
PCT Pub. Date: Sep. 6, 2013

(65) Prior Publication Data
US 2015/0056348 A1 Feb. 26, 2015

Related U.S. Application Data

(60) Provisional application No. 61/605,558, filed on Mar. 1, 2012.

(51) Int. Cl.
*A23L 1/29* (2006.01)
*A23L 1/22* (2006.01)
(Continued)

(52) U.S. Cl.
CPC .............. *A23L 1/22083* (2013.01); *A23L 1/09* (2013.01); *A23L 1/097* (2013.01); *A23L 1/22075* (2013.01);
(Continued)

(58) Field of Classification Search
CPC ............... A23L 1/09; A23L 1/22075; A23L 1/2369; A23L 1/236; A23L 1/22091;
(Continued)

(56) References Cited

U.S. PATENT DOCUMENTS 4,786,521 A * 11/1988 Bennett ................. A23L 1/09
426/658
5,034,214 A 7/1991 Palmer et al.
(Continued)

FOREIGN PATENT DOCUMENTS

EP 0087317 8/1983
EP 0159864 10/1985
(Continued)

OTHER PUBLICATIONS

International Search Report for International Application No. PCT/EP2013/054220 dated Jun. 12, 2013.
(Continued)

Primary Examiner — Helen F Heggestad
(74) Attorney, Agent, or Firm — K&L Gates LLP

(57) ABSTRACT

Nutritional products and methods for modulating off-taste intensity in nutritional products are provided. In a general embodiment, a nutritional product is provided and includes a blend of carbohydrates in an approximate 1 to 1 to 1 weight ratio. The blend of carbohydrates may include maltodextrin, corn syrup, and sugar. In another embodiment, methods for modulating off-taste intensity of nutritional compositions are provided and include modifying the sweetness of the nutritional product so that it is moderate.

20 Claims, 3 Drawing Sheets

(51) Int. Cl.
    *A23L 1/09* (2006.01)
    *A23L 1/236* (2006.01)
(52) U.S. Cl.
    CPC ............ *A23L 1/22091* (2013.01); *A23L 1/236* (2013.01); *A23L 1/2369* (2013.01); *A23V 2002/00* (2013.01)
(58) Field of Classification Search
    CPC ................ A23L 1/097; A23V 2200/15; A23V 1/2269; A23J 3/16
    USPC ................................ 426/658, 661, 648, 656
    See application file for complete search history.

(56) References Cited

U.S. PATENT DOCUMENTS

| 2008/0145511 | A1* | 6/2008 | Irwin | ........................ | A23J 3/16 |
|---|---|---|---|---|---|
| | | | | | 426/657 |
| 2014/0134316 | A1* | 5/2014 | Jincks | ................... | A23L 1/3055 |
| | | | | | 426/573 |

FOREIGN PATENT DOCUMENTS

| WO | WO9927804 | 6/1999 |
|---|---|---|
| WO | 2007033064 | 3/2007 |

OTHER PUBLICATIONS

International Written Opinion for International Application No. PCT/EP2013/054220 dated Jun. 12, 2013.
Chinese Office Action for Application No. 201380011390.6, dated Jul. 27, 2015, 11 pages.

\* cited by examiner

NUTRITIONAL PRODUCTS HAVING A MODULATED OFF-TASTE INTENSITY AND METHODS FOR MAKING AND USING SAME

CROSS REFERENCE TO RELATED APPLICATIONS

The present application is a National Stage of International Application No. PCT/EP2013/054220, filed on Mar. 1, 2013, which claims priority to U.S. Provisional Patent Application No. 61/605,558, filed Mar. 1, 2012, the entire contents of which are being incorporated herein by reference.

BACKGROUND

The present disclosure generally relates to health and nutrition. More specifically, the present disclosure relates to nutritional products and methods of making and using the nutritional products.

There are many types of nutritional compositions/products currently on the market. Nutritional compositions can be targeted toward certain consumer types, for example, young, elderly, athletic, etc., based on the specific ingredients of the nutritional composition. Nutritional compositions can also be formulated based on the certain physiological conditions that the nutritional compositions are intended to treat or improve, or may be based on desired physical or organoleptic properties of the nutritional compositions.

One goal of nutritional support is to provide a consumer with a nutritional composition containing sufficient types and amounts of nutrients to provide the consumer with a desired health effect. However, many nutrients and ingredients that are used in nutritional compositions to provide nutritional benefits to a consumer instead impart an undesirable taste or odor to the composition making it unappealing for consumption. As a result, the desired biological result is not achieved when the consumer refuses to ingest the composition due to its poor organoleptic properties. Thus, it is desired to provide nutritional compositions or products having ingredients that provide tolerable physical and organoleptic properties.

SUMMARY

Nutritional products and methods for modulating off-taste intensity in nutritional products are provided. In a general embodiment, the methods include modifying the sweetness of the nutritional product so that it is moderate. The nutritional product may be flavored or unflavored.

In an embodiment, the nutritional product is modified by adding a blend of carbohydrates. The blend of carbohydrates may include maltodextrin, corn syrup, and sugar.

In another embodiment, a nutritional product is provided that includes a blend of carbohydrates comprising maltodextrin, corn syrup, and sugar in an approximate 1 to 1 to 1 weight ratio. The nutritional product may have a flavored base or an unflavored base.

In an embodiment, the sugar is sucrose.

In an embodiment, the maltodextrin has a DE ranging from about 8 to about 12.

In an embodiment, the corn syrup has a DE ranging from about 24 to about 29.

In an embodiment, the maltodextrin has a DE of about 10 and the corn syrup has a DE of about 25.

In an embodiment, the product includes at least one ingredient selected from the group consisting of a protein, a lipid, a vitamin, or combinations thereof.

In yet another embodiment, a method for producing a nutritional product is provided. The method includes adding to a base a blend of carbohydrates comprising maltodextrin, corn syrup, and sugar in an approximate 1 to 1 to 1 weight ratio. The nutritional product may have a flavored base or an unflavored base.

In an embodiment, the sugar is sucrose.

In an embodiment, the corn syrup has a DE ranging from about 24 to about 29.

In an embodiment, the maltodextrin has a DE of about 10 and the corn syrup has a DE of about 25.

In an embodiment, the product includes at least one ingredient selected from the group consisting of a protein, a lipid, a vitamin, or combinations thereof.

An advantage of the present disclosure is to provide nutritional products having improved organoleptic properties.

Another advantage of the present disclosure is to provide nutritional products having moderate sweetness intensities.

Yet another advantage of the present disclosure is to provide nutritional products having optimized ratios of specific carbohydrate sources to provide off-taste modulating effects.

Still yet another advantage of the present disclosure is to provide methods for modulating off-taste intensity of nutritional products.

Another advantage of the present disclosure is to provide methods for producing nutritional products having acceptable organoleptic properties.

Additional features and advantages are described herein, and will be apparent from the following Detailed Description and the figures.

DETAILED DESCRIPTION

Figure 1:
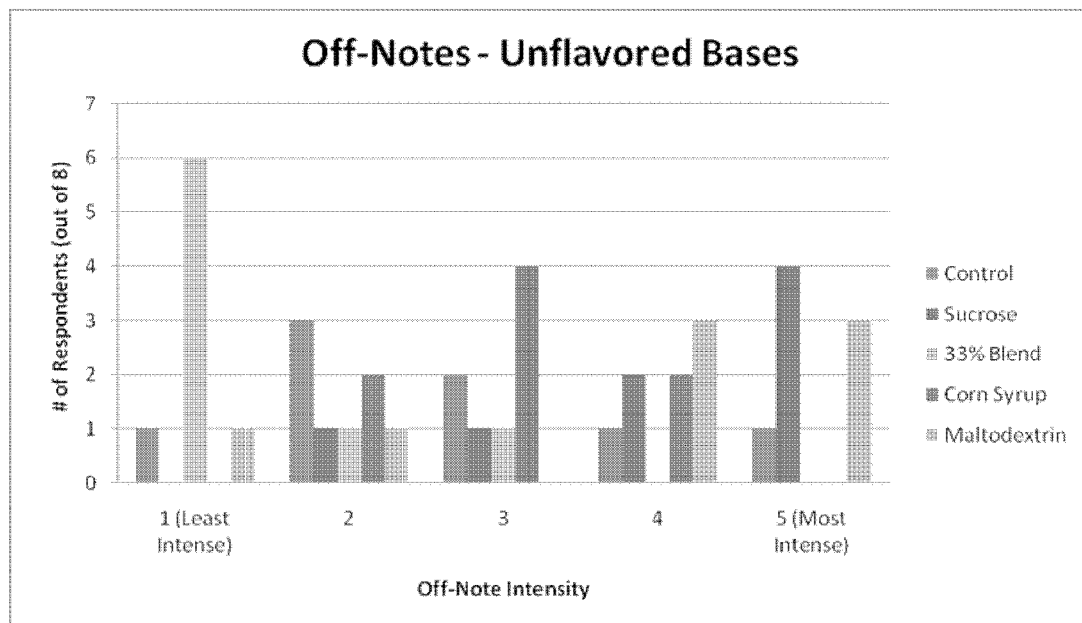
FIG. 1 illustrates a graph of the off-note intensities detected in unflavored composition bases containing different carbohydrate sources in accordance with an embodiment of the present disclosure.

As used herein, "about" is understood to refer to numbers in a range of numerals. Moreover, all numerical ranges herein should be understood to include all integer, whole or fractions, within the range.

As used here, "DE" refers to dextrose equivalent, which is a measure of the amount of reducing sugars present in a sugar product, relative to glucose, expressed as a percentage on a dry basis. For example, a maltodextrin with a DE of 10 would have 10% of the reducing power of dextrose (which has a DE of 100), while sucrose, with a DE of 120, would have 1.2 times the reducing power.

As used herein, "moderate," "moderate sweetness" or "moderately sweet" refer to a sweetness intensity that ranges between the sweetness of pure maltodextrin (DE 10) and sucrose (DE 25).

As mentioned above, many nutrients and ingredients that are used in nutritional compositions to provide nutritional benefits to a consumer instead impart an undesirable taste or odor to the composition making it unappealing for consumption. As a result, the desired biological result is not achieved when the consumer refuses to ingest the composition due to its poor organoleptic properties. Indeed, a common complaint by target consumers for a known nutritional composition marketed by Applicants is that the composition is too sweet and, therefore, not appealing for consumption.

Applicants have investigated two different versions of the known nutritional composition, where the first version is unflavored and the second version includes a vanilla flavoring, to determine how the sensory profile of the nutritional composition is affected by varying ingredient types within the flavored and unflavored nutritional compositions.

In the present disclosure, the primary ingredient that was varied includes the source of carbohydrates, as well as the amounts of each type of carbohydrate used in the compositions. The tests described herein below include, for example, descriptions and comparisons of the sensory attributes (excluding appearance) of all of the nutritional compositions tested. The unflavored and flavored samples were then ranked, respectively, on off-note flavor intensity and sweetness intensity. Applicants sought to understand the impact each carbohydrate source (e.g., corn syrup, maltodextrin and sucrose) has on the sensory profile of the compositions, and to determine which sensory attributes in the base compositions are perceptible when the base is flavored, as opposed to unflavored.

As will be described further in the Examples below, Applicants have surprisingly found that a specific blend of carbohydrates in a weight ratio of 1 to 1 to 1 can have an effect on modulating off-taste intensity in both flavored and unflavored nutritional compositions. The carbohydrates include maltodextrins, corn syrup, and sugar (e.g., sucrose). Surprisingly, the blend of these three carbohydrates in a 1:1:1 weight ratio provides a moderate sweetness intensity level that is desirable for consumers. Indeed, Applicants have surprisingly found that artificial sweetener, floury, salty and soy off-flavors are lower when the carbohydrate source of the products is the blended carbohydrate source of the present disclosure. Additionally, few sensory differences are found between a vanilla flavored base and an unflavored base.

The dextrose equivalent ("DE") of the maltodextrin of the present disclosure may range from about 8 to about 12, or from about 9 to 11, or may be about 10. The DE of the corn syrup of the present disclosure may range from about 24 to about 29, or from about 25 to about 28, or may be about 25, or 26, or 27, or the like.

By way of example and not limitation, the following examples are illustrative of various embodiments of the present disclosure.

Example 1

Applicants performed taste evaluations of both the flavored and unflavored bases to describe the attributes of five different carbohydrate sources. The recipes for the samples evaluated were constant, with the exclusion of the carbohydrate source that was varied from sample to sample. Although the carbohydrate source was varied, the same amount of carbohydrates in each sample was constant. All samples were made in a flavored and an unflavored version. A control formula was used as a reference and is representative of a flavored nutritional composition that is currently marketed by Applicants. Each evaluator tasted the samples blind, and serving order of the samples was balanced. Each evaluator individually tasted, described and ranked the off-note and sweetness intensities of the unflavored and flavored bases. The testing procedures are set forth in greater detail below.

Product Preparation

The products were served at refrigerated temperature (4° C.). To prepare the samples, the bottles for each product were shaken eight times. Bottles of the same product were poured into a pitcher and mixed well. These pitchers were refrigerated until being poured into the sample cups. Evaluators were served three ounces of each product into coded four-ounce solo cups with lid. Samples were provided to each evaluator individually and only immediately before the evaluator was ready to evaluate the given sample to ensure the proper refrigerated temperature was maintained.

Panelists participated in three test sessions. They individually rated all products in the first session and first half of the second session; the second half of the second session and third session served as a replicate. They made intensity ratings of flavor and taste on the standard citric acid scale, rated odors on the standard butanol scale, and rated textures on a 20-point scale anchored with references. Sensory attributes may include, for example, vanilla aroma, milky aroma, soy aroma, caramel aroma, floury aroma, bran aroma, vitamin aroma, oxidized oil aroma, pour, stir, coating, bubbles, sweetness, saltiness, overall intensity of flavor, vanilla flavor, soy flavor, caramel flavor, butterscotch flavor, floury flavor, bran flavor, oxidized oil flavor, artificial sweet flavor, sipping, swish, adhesiveness, mouth coating, etc.

During each session, evaluators first rated a calibration citric acid sample and a calibration butanol sample. They were given immediate feedback on the level of intensity of these samples as part of an ongoing effort to maintain their knowledge of these intensities and to calibrate their responses. Evaluators then rated the intensity of each attribute for each of the products. The orders in which they evaluated the samples were balanced among the panelists for order and carryover effects using Latin squares.

Statistical Analysis

SAS PROC GLM (version 9.1) was used to determine whether all the samples (flavored and unflavored products analyzed in separate analyses) differed in any of the specific attributes. The attribute intensity was the dependent variable, evaluator and product were predictors. When there were significant differences, the Student-Newman-Keuls Test was used to determine which products differed significantly on the given attribute.

A separate analysis (PROC GLM) was conducted with all products. Within that analysis, contrast procedures were used to compare the flavored and flavored versions of each sample.

Attributes with at least one mean intensity rating greater than 1.0 and with significant difference among all products (P<0.05) were selected for inclusion in the results tables and plots.

Principle components analysis ("PCA") with Varimax rotation (XLSTAT®) was conducted separately for the flavored and for the unflavored products, using only those attributes that differed significantly among the beverages, those attributes that had at least one mean intensity rating greater than 1.0 in the subset of products (flavored or unflavored), and those attributes that were not redundant. Redundant attributes were defined as those having correlations >0.95 with other attributes for the flavored products, and those with correlations >0.90 for the unflavored products. When attributes were considered redundant, the attribute with the largest range of mean scores was selected to represent the group of highly correlated attributes.

Evaluators also participated in one review session and three test sessions. In the review session, evaluators individually compared pairs of samples using the terms on a vanilla lexicon, and by suggesting other terms if relevant to the samples. Terms from the vanilla lexicon include, for example, overall intensity, vanilla, cocoa, milky, cooked milk, cream, soy, caramel, anise/licorice, malty, pineapple, berry, floral, floury, bran, starchy, grassy, nutty, minty yeasty, vitamin, cardboardy, oxidized oil, soured milk, moldy, metallic, artificial sweetener, other flavor/aromas, etc. The evaluators then participated in a group discussion to discuss the main differences between the products and to determine if any terms needed to be added to the lexicon.

Results

Generally

Applicants found distinct differences between the five different carbohydrate sources, and each carbohydrate source resulted in different levels of sweetness and off-notes. The attributes used to describe both the flavored and unflavored samples for each carbohydrate source are listed below in Table 1.

TABLE 1

| Variable | Attributes |
|---|---|
| Control (56% Sucrose, 44% 25 DE Corn Syrup) | Very Sweet, Moderately Thick, Cowy |
| Maltodextrin (10 DE) | Not Sweet, Cowy, Salty, Astringent |
| Corn Syrup | Very Sweet, Artificial Sweetener Flavor, Chalky |
| Sucrose | Bland Without Off-Notes, Low Sweet, Plain Astringent |
| CHO Blend (33% Sucrose, 33% 10 DE Maltodextrin, 33% 25 DE Corn Syrup) | Moderately Sweet, Fresh Dairy, Creamy |

Applicants surprisingly found that blending carbohydrates resulted in minimizing off-notes and achieving moderate levels of sweetness. In the current flavored nutritional composition marketed by Applicants, a blend of sucrose and corn syrup appears to produce off-notes in dairy as compared to blending sucrose, corn syrup and maltodextrin in equal parts, as was surprisingly found. In general, the flavored bases had lower off-note intensities and more sweetness; however, vanilla flavor was not highly detectable in the flavored bases. Accordingly, Applicants have found that the flavoring acts to minimize the number and intensity of off-notes while enhancing the sweetness of the product. The flavoring does not appear to impart a vanilla aroma or flavor to the product distinct from the sensory attributes in the base.

The full data from the taste experiments summarized just prior to Table 1 above is set forth below in Table 2. The underlined text in Table 2 denotes the attributes that were used, within the same variable, to describe both the flavored and unflavored samples.

TABLE 2

| Variable | Unflavored | Flavored |
|---|---|---|
| Control | Sweet, Dairy, Cowy, Mod. Sweetness, Not Beany, Mod. Thickness | Very Sweet, Overpowering Sweetness, Vanilla, Sl. Thick, Clean Aftertaste |
| Maltodextrin | Sour, Cowy, Barny, Soybean, Salty, Protein, Dirty, Not Sweet, Thick, Slimy, Astringent | No Sweetness, Salty, Vanilla, Bland, Dairy, Astringent, Chalky, Cowy Aftertaste |
| Corn Syrup | Not Sweet, Cowy, Plain, Astringent | Bland Without Off-Notes, Bitter, Sl. Grassy, Low Sweetness, Watery, Salty, Very Low Vanilla, Astringent, Cardboardy Aftertaste |
| Sucrose | Cowy, Dirty, Very Sweet, Artificial Sweetener, Rotten Egg, Light Struck Milk, Chalky, Thin | Very Sweet, Artificial Sweetener, Low Vanilla |
| 33% Blend | Dairy, Standard, Moderate Sweetness, Fresh Dairy | Beany, Moderate Sweetness, Butterscotch, Creamy, Bland/Mild Vanilla, Low Sweet, Relatively Clean, Slimy, Sweet Aftertaste |

Applicants also ranked the set of unflavored samples and the set of flavored samples on off-note intensities and sweetness intensities. The results from the ranking process are summarized graphically at FIGS. 1-4. Applicants surprisingly found that the ranking results were similar for the flavored and unflavored bases, with the flavored bases offering a little more clarity on the off-note intensity amongst the samples. Overall, it can be deduced that the sucrose samples had the most off-note intensity and the most sweetness, but the 33% blend samples had the least off-note intensity and moderate relative sweetness intensities.

Specifically, and as show in FIG. 1, for the unflavored bases, the 33% blend sample had the least off-note intensity and the sucrose sample had the most off-note intensity. The ranking was less obvious for the remaining samples; however, it appears that the control sample had the second lowest intensity, followed by the corn syrup sample and the maltodextrin sample.

Figure 2:
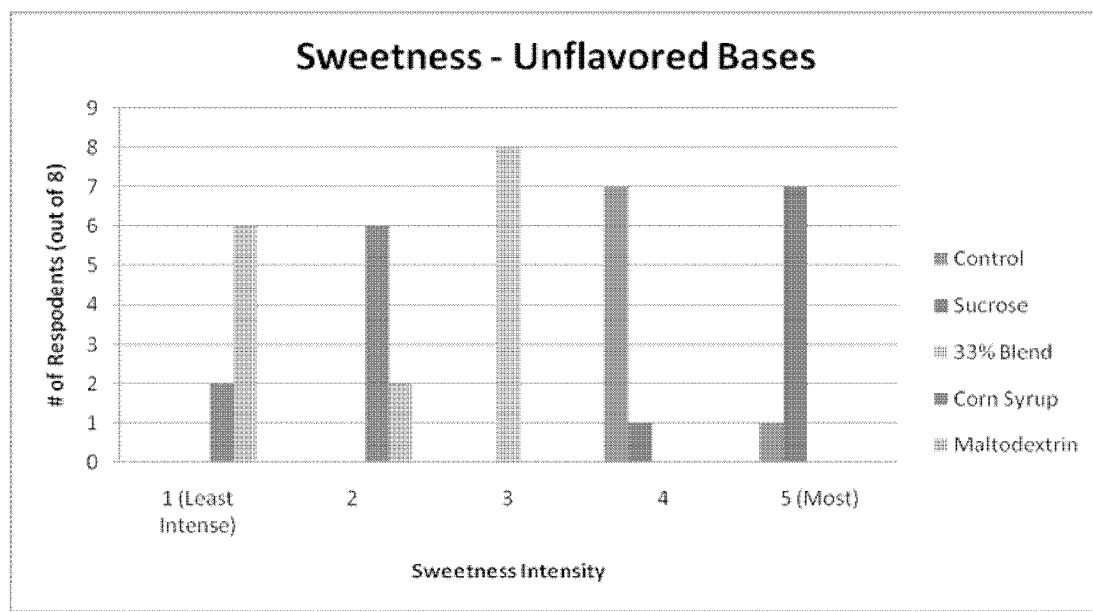
FIG. 2 illustrates a graph of the sweetness intensities detected in unflavored composition bases containing different carbohydrate sources in accordance with an embodiment of the present disclosure.

As shown in FIG. 2, the sweetness intensity for the unflavored bases showed clear results, with the majority of evaluators ranking the samples in the following order from least to most sweetness intensity: maltodextrin, corn syrup, 33% blend, control, sucrose.

Figure 3:
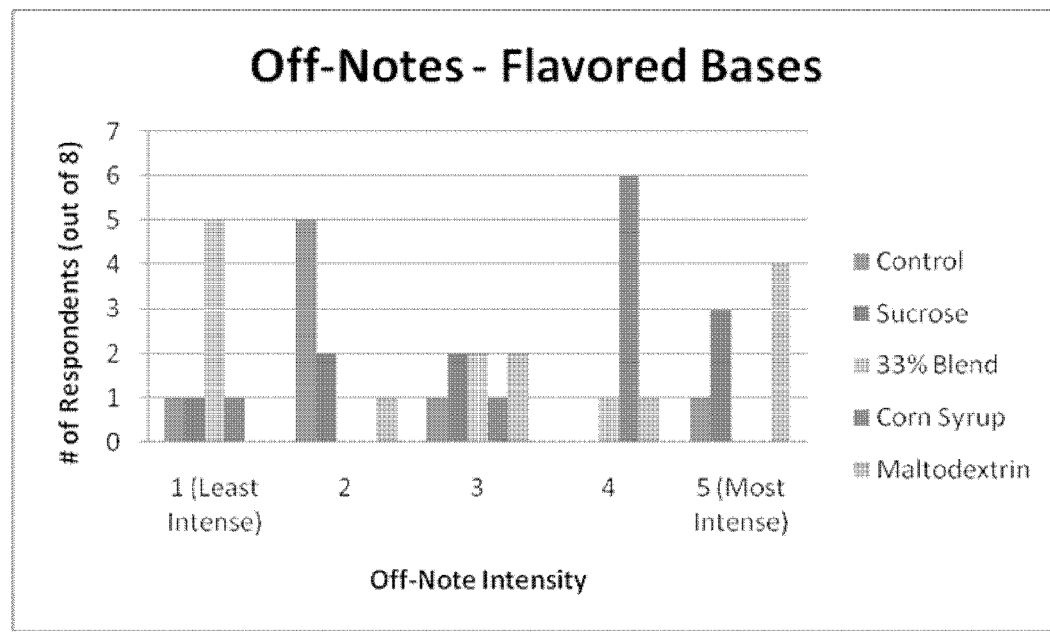
FIG. 3 illustrates a graph of the off-note intensities detected in flavored composition bases containing different carbohydrate sources in accordance with an embodiment of the present disclosure.

For the flavored bases, as shown in FIG. 3, the 33% blend had the least off-note intensity, followed by the control sample. The corn syrup sample fell in the middle, while the sucrose and maltodextrin samples had the most off-note intensity.

Figure 4:
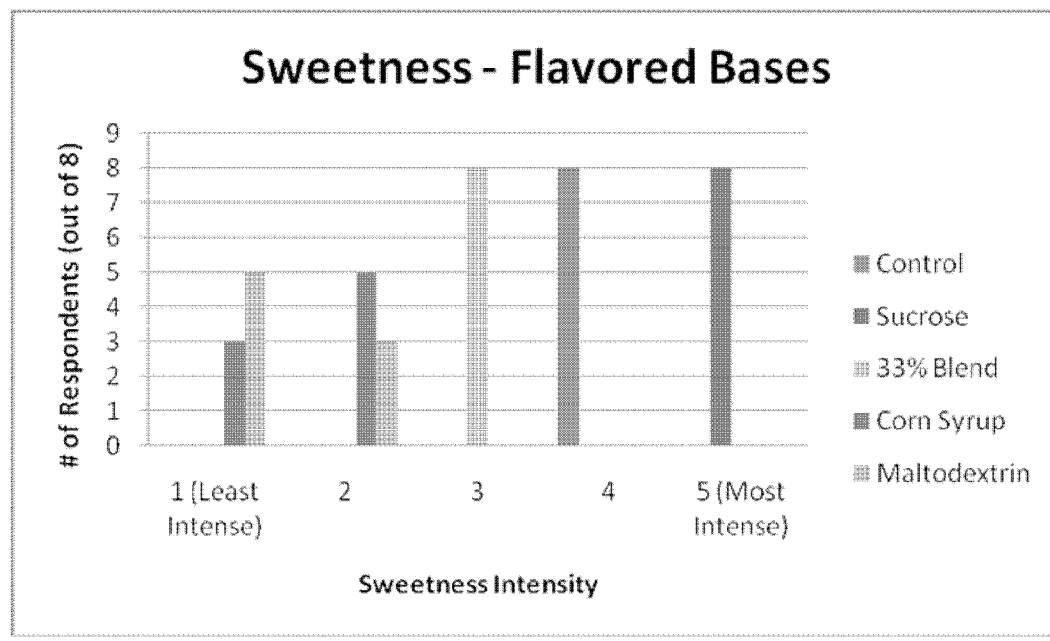
FIG. 4 illustrates a graph of the sweetness intensities detected in flavored composition bases containing different carbohydrate sources in accordance with an embodiment of the present disclosure.

As shown in FIG. 4, the maltodextrin and corn syrup samples for the flavored bases were found to have the least sweetness intensity, followed by the 33% blend sample, then the control sample and lastly, the sucrose sample.

Figure 5:
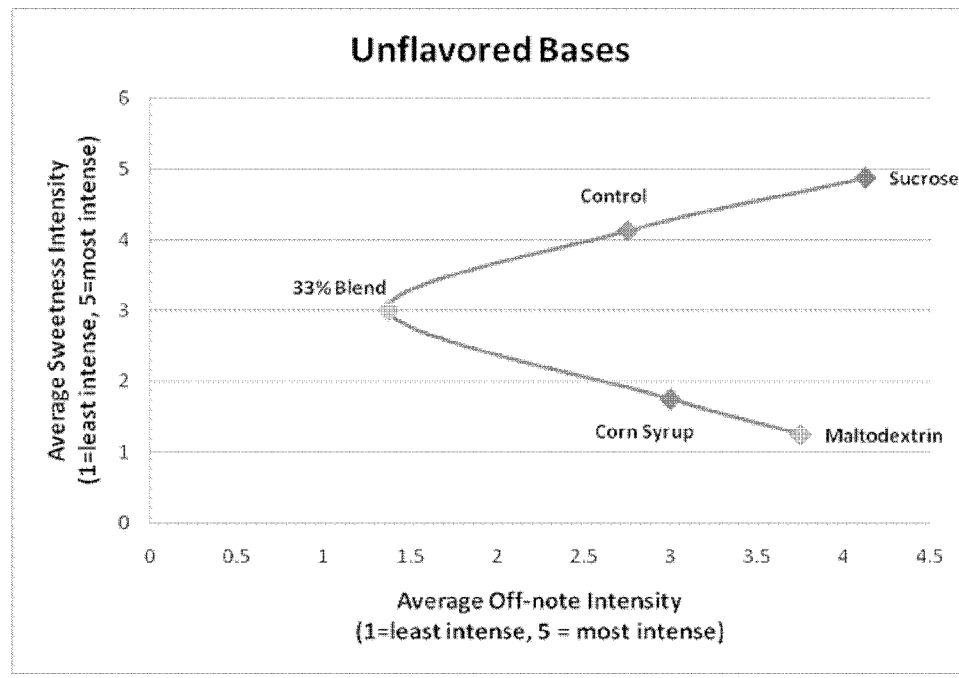
FIG. 5 illustrates a graph of the average off-note intensities versus the average sweetness intensities detected in unflavored composition bases containing different carbohydrate sources in accordance with an embodiment of the present disclosure.
Figure 6:
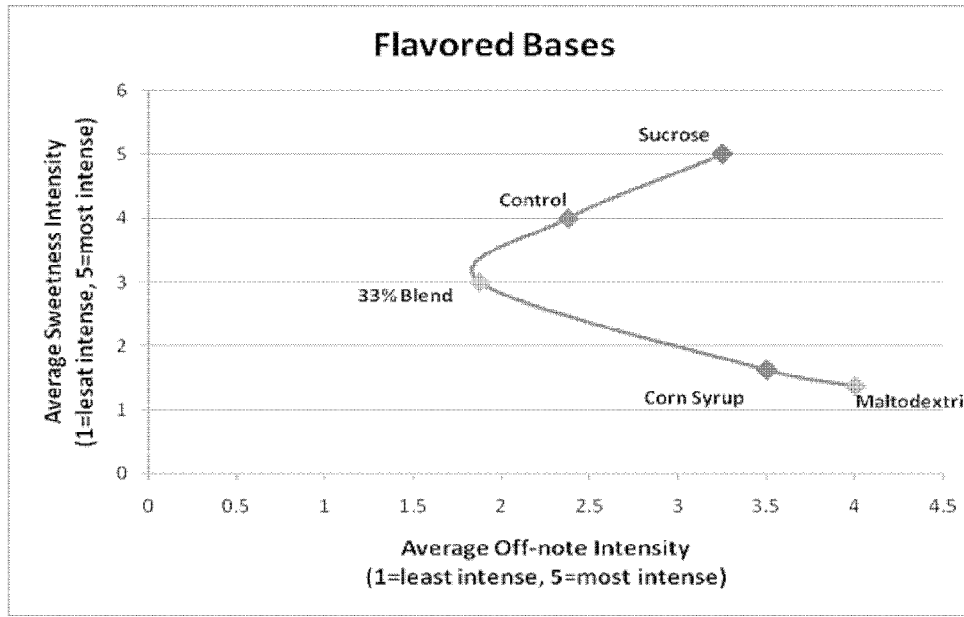
FIG. 6 illustrates a graph of the average off-note intensities versus the average sweetness intensities detected in flavored composition bases containing different carbohydrate sources in accordance with an embodiment of the present disclosure.

In both the flavored and unflavored bases, the samples which had mid-sweetness intensities were shown to have lower off-note intensities. This suggests a parabolic relationship, as shown in FIGS. 5 and 6, between off-note intensity and sweetness intensity. In this regard, when sweetness intensity is low or high, off-note intensity appears to be maximized, and when sweetness intensity is moderate, off-note intensity appears to be minimized.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for modulating off-taste intensity in a nutritional product having at least one off-flavor selected from the group consisting of astringency, artificial sweetener off-flavor, floury off-flavor, salty off-flavor, and soy off-flavor, the method comprising modifying the sweetness of the nutritional product, so that the sweetness of the nutritional product is moderate, by adding a blend of carbohydrates comprising maltodextrin, corn syrup, and sugar in an approximate 1 to 1 to 1 weight ratio, the nutritional product comprising at least a protein.

2. The method of claim 1, wherein the nutritional product is flavored.

3. The method of claim 1, wherein the nutritional product is unflavored.

4. A nutritional product comprising:
   at least a protein;
   a blend of carbohydrates comprising maltodextrin, corn syrup, and sugar in an approximate 1 to 1 to 1 weight ratio; and
   a base having at least one off-flavor selected from the group consisting of astringency, artificial sweetener off-flavor, floury off-flavor, salty off-flavor, and soy off-flavor.

5. The nutritional product of claim 4, wherein the sugar is sucrose.

6. The nutritional product of claim 4, wherein the maltodextrin has a DE ranging from about 8 to about 12.

7. The nutritional product of claim 4, wherein the corn syrup has a DE ranging from about 24 to about 29.

8. The nutritional product of claim 4, wherein the maltodextrin has a DE of 10 and the corn syrup has a DE of 25.

9. The nutritional product of claim 4, wherein the base is a flavored base.

10. The nutritional product of claim 4, wherein the base is an unflavored base.

11. The nutritional product of claim 4, wherein the nutritional product further comprises an ingredient selected from the group consisting of a lipid, a vitamin, and combinations thereof.

12. A method for producing a nutritional product, the method comprising: adding to a base having at least one off-flavor selected from the group consisting of astringency, artificial sweetener off-flavor, floury off-flavor, salty off-flavor, and soy off-flavor a blend of carbohydrates comprising maltodextrin, corn syrup, and sugar in an approximate 1 to 1 to 1 weight ratio, the nutritional product comprising at least a protein.

13. The method of claim 12, wherein the sugar is sucrose.

14. The method of claim 12, wherein the maltodextrin has a DE ranging from about 8 to about 12.

15. The method of claim 12, wherein the corn syrup has a DE ranging from about 24 to about 29.

16. The method of claim 12, wherein the base is a flavored base.

17. The method of claim 12, wherein the base is an unflavored base.

18. The method of claim 12, wherein the nutritional product further comprises an ingredient selected from the group consisting of a lipid, a vitamin, and combinations thereof.

19. The method of claim 12, wherein the at least one off-flavor comprises astringency.

20. The method of claim 12, wherein the at least one off-flavor comprises artificial sweetener off-flavor.

* * * * *